(12) United States Patent
Lin et al.

(10) Patent No.: US 9,583,816 B2
(45) Date of Patent: Feb. 28, 2017

(54) WIRELESS TRANSCEIVER

(71) Applicant: Wistron NeWeb Corporation, Hsinchu (TW)

(72) Inventors: Yung-Cheng Lin, Hsinchu (TW); Chien-Ming Peng, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 319 days.

(21) Appl. No.: 14/493,328

(22) Filed: Sep. 22, 2014

(65) Prior Publication Data
US 2015/0364811 A1     Dec. 17, 2015

(30) Foreign Application Priority Data

Jun. 11, 2014   (TW) .............................. 103120174 A

(51) Int. Cl.
| | |
|---|---|
| *H01Q 1/24* | (2006.01) |
| *H04W 4/20* | (2009.01) |
| *H04W 4/22* | (2009.01) |
| *H04B 1/3888* | (2015.01) |
| *H04M 1/23* | (2006.01) |
| *H04M 1/725* | (2006.01) |

(52) U.S. Cl.
CPC ............. *H01Q 1/24* (2013.01); *H04B 1/3888* (2013.01); *H04M 1/23* (2013.01); *H04W 4/20* (2013.01); *H04W 4/22* (2013.01); *H04M 1/72541* (2013.01)

(58) Field of Classification Search
CPC ........ H04B 1/3888; H04W 4/20; H04W 4/22; H04M 1/72541; H04M 1/23; H01Q 1/24
USPC ........................................... 343/700 MS, 702
See application file for complete search history.

(56) References Cited

U.S. PATENT DOCUMENTS

| | | | | |
|---|---|---|---|---|
| 5,063,389 | A * | 11/1991 | Reits ........................ | H01Q 3/01 342/359 |
| 6,700,540 | B2 * | 3/2004 | Holshouser ............ | H01Q 1/243 343/700 MS |
| 2005/0264452 | A1 * | 12/2005 | Fujishima .............. | H01Q 1/243 343/700 MS |

FOREIGN PATENT DOCUMENTS

| | | |
|---|---|---|
| TW | I294630 | 3/2008 |
| TW | 201110173 | 3/2011 |

* cited by examiner

*Primary Examiner* — Hoanganh Le
(74) *Attorney, Agent, or Firm* — Winston Hsu; Scott Margo

(57) ABSTRACT

A wireless transceiver includes at least one antenna, a substrate, and a mechanical part on which the at least one antenna is disposed, wherein a relative position between the at least one antenna and the substrate is changed when an external force is applied to the mechanical part.

12 Claims, 5 Drawing Sheets

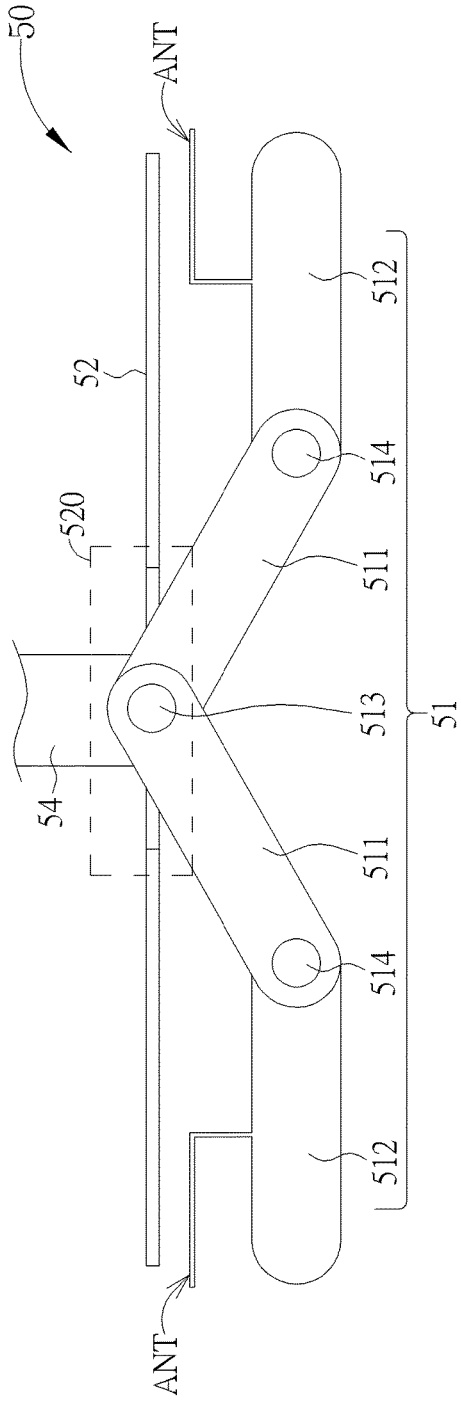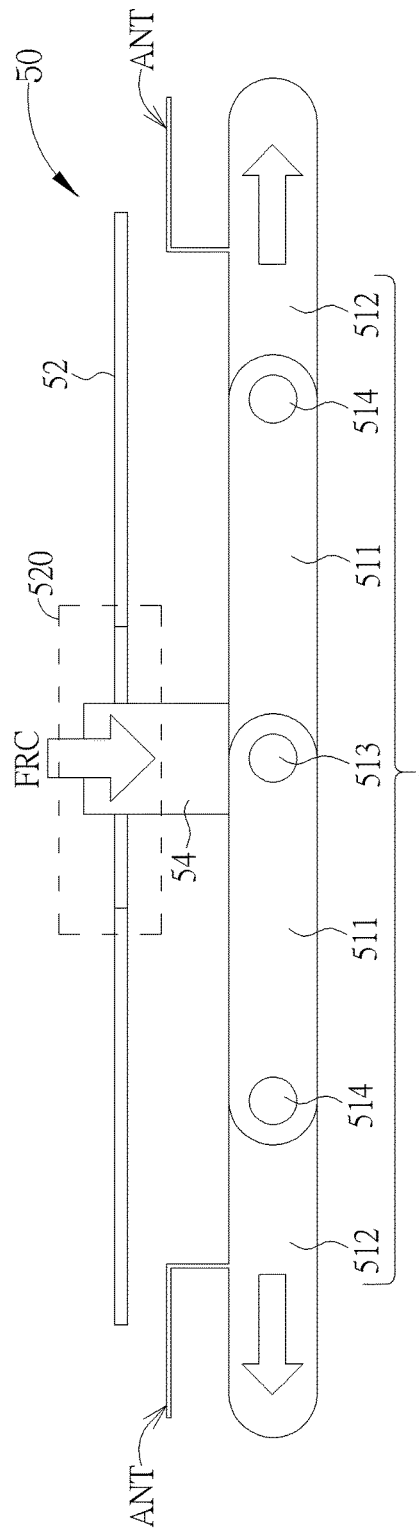

WIRELESS TRANSCEIVER

BACKGROUND OF THE INVENTION

1. Field of the Invention

The present invention relates to a wireless transceiver, and more particularly, to a wireless transceiver for keeping antenna performance at a certain level when its button device is pressed by a user.

2. Description of the Prior Art

Wireless service calling system is an electronic product combining wireless communication technology with computer technology, and is widely used in restaurants, hospitals, household services, factory production lines, entertaining rooms, etc. The wireless service calling system may include a host and a plurality of wireless transceivers, wherein the host and the wireless transceivers may exchange wireless signals with each other via wireless communication techniques. The wireless transceiver is usually designed with a button for triggering the wireless transceiver to transmit a calling signal to the host once the button is pressed by a user, thereby a monitoring staff at the host end may be notified that there is a need to provide services to the user.

For different applications, the host may be further connected to the Internet by which to transmit the calling signal to another monitoring staff or user to achieve far-end monitoring. For example, for household services applications, the wireless transceivers may be carried by an elder people and a young child, and the host may be disposed in a living room or a front gate. The child may press the button on the wireless transceiver to transmit the calling signal to the host when back home, the host then forwards the calling signal to parents at the monitoring end to notify the parents that the child is safely home. Or, the elder people may press the button on the wireless transceiver to transmit the calling signal to the host when encountering an accident at home, the host then forwards the calling signal to family members or nearby medical centers to notify the appropriate people of the accident. Moreover, the host may distinguish specific uses of the calling signal by different coding schemes, e.g. long or short press on the button.

The wireless transceivers of the wireless calling system may be integrated into small electronic devices, such as wearable devices, key rings or switch devices, to be portable by the user or placed in interior decorations. Therefore, the wireless transceiver is designed to have a small size to be held in palms. However, when a human body or a relative large conductor approaches the small wireless transceiver, antennas of the wireless transceiver may be influenced significantly by the human body (e.g. signal block or frequency shift) to weaken a function of wireless communication of the wireless transceiver.

Therefore, an antenna performance of the wireless transceiver shall be kept at a certain level when the button device is pressed by the user once an emergency occurs, to prevent the calling signal from being delayed due to the bad antenna performance. Thus, how to keep the antenna performance of the wireless transceiver at a certain level when the button device is pressed by the user has become a topic of the industry.

SUMMARY OF THE INVENTION

It is therefore an objective of the present invention to provide a wireless transceiver for keeping an antenna performance at a certain level when its button device is pressed by a user.

An embodiment of the present invention discloses a wireless transceiver including at least one antenna, a substrate, and a mechanical part on which the at least one antenna is disposed, wherein a relative position between the at least one antenna and the substrate is changed when an external force is applied to the mechanical part.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5A illustrates a cross-section of a wireless transceiver according to another embodiment of the present invention.

FIG. 5B illustrates a deformation of the wireless transceiver shown in FIG. 5B when an external force is applied.

DETAILED DESCRIPTION

Figure 1:
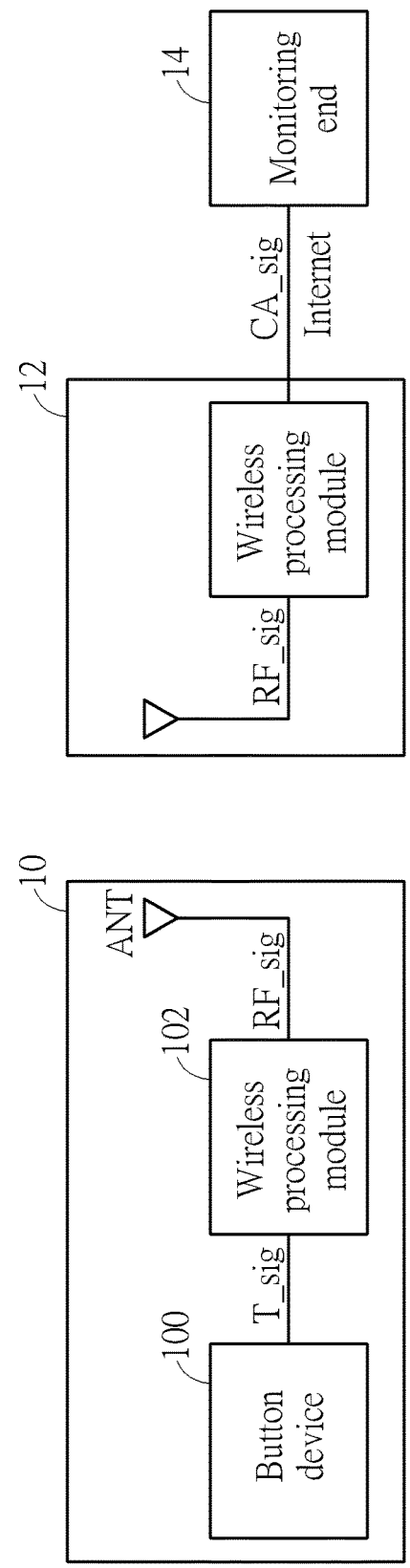
FIG. 1 is a schematic diagram of a wireless calling system 1 according to an embodiment of the present invention.

Please refer to FIG. 1, which is a schematic diagram of a wireless calling system 1 according to an embodiment of the present invention. The wireless calling system 1 includes at least one wireless transceiver 10, a host 12 and at least one monitoring end 14. The wireless transceiver 10 and the host 12 may exchange a wireless signal RF_sig via wireless communication techniques such as Bluetooth, WiFi or Zigbee. The wireless transceiver 10 includes a button device 100, a wireless processing module 102 and at least one antenna ANT. When the button device 100 is triggered by a press of a user, the button device 100 generates a trigger signal T_sig to the wireless processing module 102. The wireless processing module 102 generates the wireless signal RF_sig to the antenna ANT according to the trigger signal T_sig, to transmit the wireless signal RF_sig to the host 12 via the antenna ANT. The host 12 immediately transmits a calling signal CA_sig corresponding to the wireless signal RF_sig to the monitoring end 14 via the Internet when the wireless signal RF_sig is received, so as to report to the monitoring end 14 that the calling signal CA_sig is generated. Therefore, the wireless calling system 1 may achieve far-end monitoring by the above mentioned operations.

Figure 2:
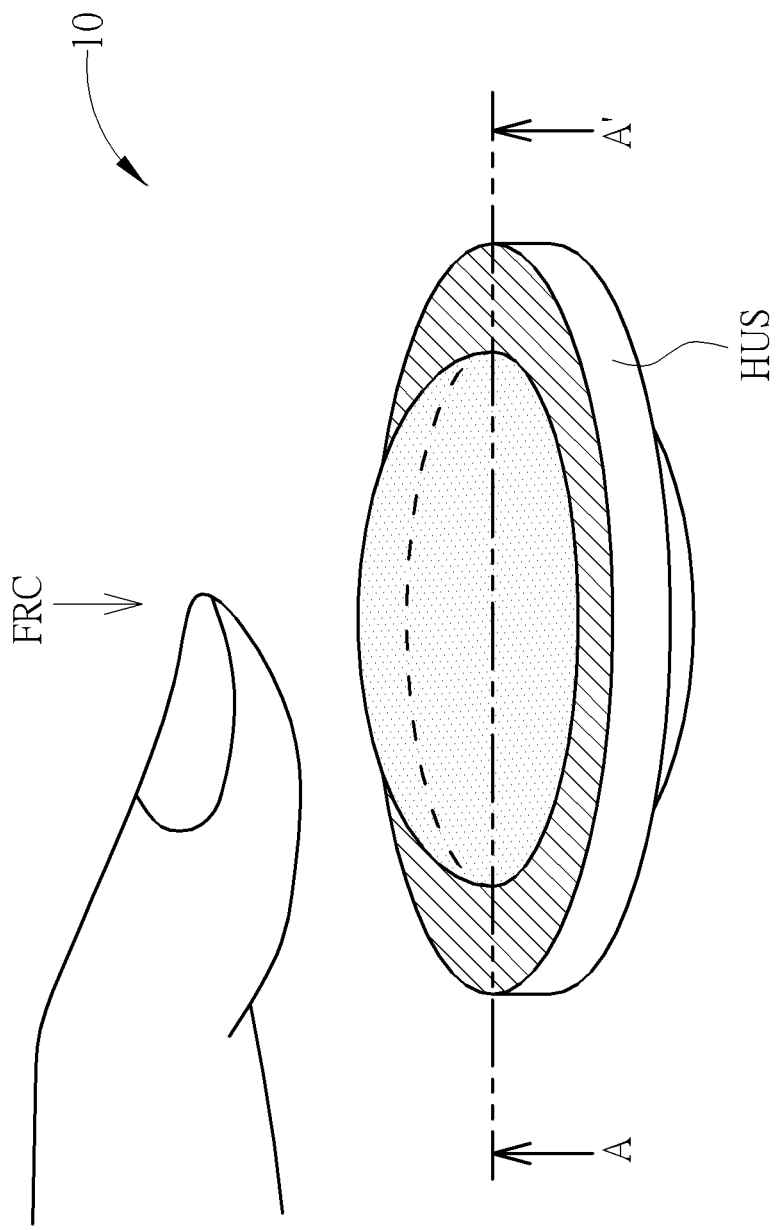
FIG. 2 illustrates an appearance of the wireless transceiver shown in FIG. 1.

Please refer to FIG. 2, which illustrates an appearance of the wireless transceiver 10 shown in FIG. 1. The wireless transceiver 10 is covered by a housing HUS. The wireless transceiver 10 presents a dish, on a center of the dish is elevated to form a button area (denoted with dot patterns) for being pressed by the user, while an area other than the button area forms a rim area (denoted with oblique lines). The housing HUS is preferably made of flexible materials to be flexible, thereby the housing HUS may be deformed when the user applies an external force FRC to the button area, such that the button device 100 (not shown in FIG. 2) may be touched by the deformed housing HUS to trigger the wireless transceiver 10 transmitting the wireless signal RF_sig. On the contrary, when the user releases the wireless transceiver 10, the housing HUS returns its original appearance and stops transmitting the wireless signal RF_sig. Of course, the appearance of the wireless transceiver 10 is not limited to the dish, which may be modified according to practical requirements.

Noticeably, at a moment when the housing HUS is pressed by the user, which may be regarded as an approaching of a relative large conductor to the antenna ANT of the wireless transceiver 10, so an antenna performance of the antenna ANT may be significantly influenced by the press, e.g. signal block, frequency shift, etc., to weaken a function of the wireless communication of the wireless transceiver 10. Therefore, the antenna performance shall be kept at a certain level when the button area is pressed by the user to ensure that the wireless signal RF_sig is immediately transmitted when an emergency occurs.

Since the antenna performance or characteristics such as the radiation efficiency and radiation pattern is related to its surrounded environment, under a condition that an antenna body is kept unchanged, changing a relative position between the antenna body and the surrounded environment may be regarded as changing the radiation pattern and angel of the antenna. Accordingly, the wireless transceiver 10 of the present invention changes the relative position between the antenna body and the surrounded environment via the external force provided by the user when the button area is pressed, which effectively changes the radiation pattern of the antenna to ensure the antenna performance is kept at a certain level. Therefore, by carefully arranging the relative position between the antenna and the surrounded environment, the radiation pattern of the antenna may be changed by the press provided by the user, which reduces an influence due to the approaching of fingers of the human body to ensure the antenna performance is kept at a certain level such that the wireless signal is immediately transmitted.

Figure 3A:
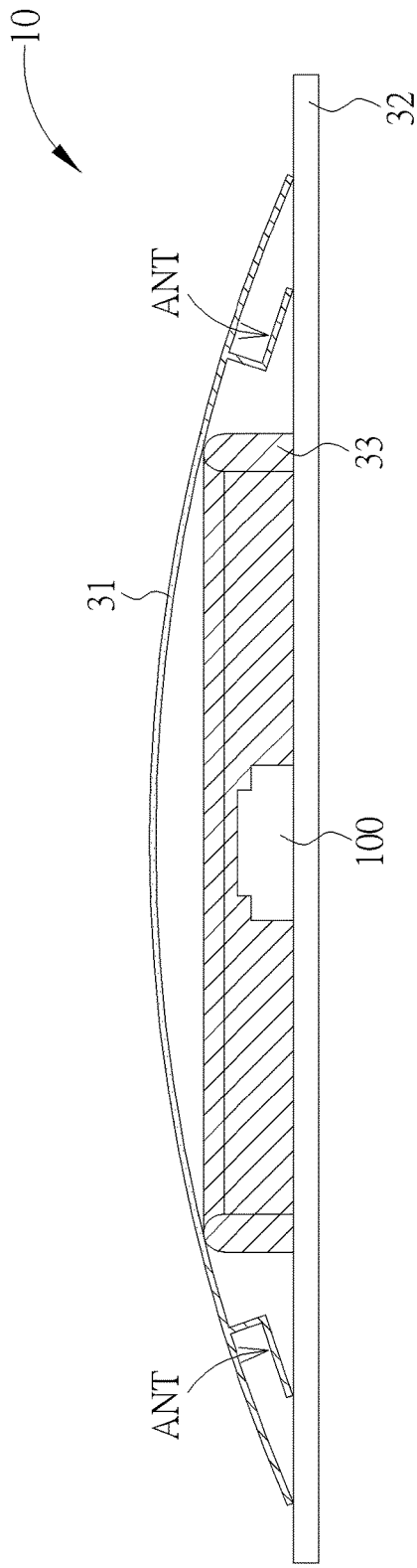
FIG. 3A illustrates a cross-section of the wireless transceiver shown in FIG. 1 along points A to A' shown in FIG. 2.
Figure 3B:
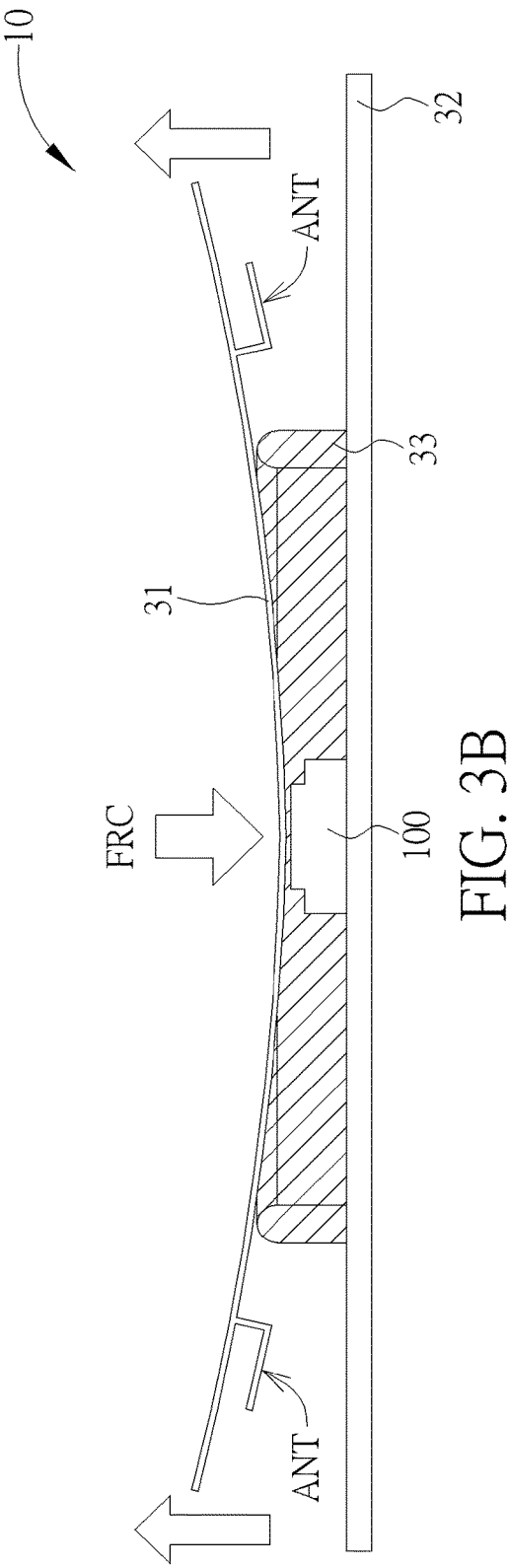
FIG. 3B illustrates a deformation of the wireless transceiver shown in FIG. 3A when the external force is applied.

Specifically, please refer to FIG. 3A to FIG. 3B. FIG. 3A illustrates a cross-section of the wireless transceiver 10 along points A to A' shown in FIG. 2, and FIG. 3B illustrates a deformation of the wireless transceiver 10 when the external force is applied. As shown in FIG. 3A, a mechanical part 31, a substrate 32, a supporting part 33, at least one antenna ANT and the button device 100 are included and disposed in the wireless transceiver 10. In this embodiment, the mechanical part 31 is made of flexible materials to be a flexible mechanical part.

Structurally, the antenna ANT is disposed on the flexible mechanical part 31, and the flexible mechanical part 31 is deformed when an external force is applied, such that a relative position between the antenna ANT and the substrate 32 is changed, which effectively changes the radiation pattern of the antenna ANT. The antenna ANT may be disposed on the flexible mechanical part 31 via a production process such as printing, electroplating, soldering, Surface mounting technology (SMT), and so on. The button device 100 is disposed on the substrate 32 for generating the trigger signal T_sig to the wireless processing module 102 when the external force is applied to the flexible mechanical part 31 to touch the button device 100, which triggers the wireless processing module 102 to generate the wireless signal RF_sig to the antenna ANT according to the trigger signal T_sig. The supporting part 33 is disposed on the substrate 32, surrounding the button device 100, and used for supporting the flexible mechanical part 31. Without the external force applied to the flexible mechanical part 31, or when the external force applied to the flexible mechanical part 31 disappears, the flexible mechanical part 31 presents a downwardly-disposed dish to cover the supporting part 33 and the button device 100.

The flexible mechanical part 31 may be divided into a button area (denoted with dot patterns) and a rim area (denoted with oblique lines). The flexible mechanical part 31 may be an independent part or a part of the housing HUS; the antenna ANT is preferably arranged in the rim area to be away from fingers of the user when the user is pressing on the button area of the housing HUS (or the flexible mechanical part 31), which protects the antenna ANT from being completely blocked by the fingers to ensure the antenna performance is kept at a certain level.

In operation, as shown in FIG. 3B, when the finger is pressing on the button area of the housing HUS (or the flexible mechanical part 31), which means the external force FRC is applying to the flexible mechanical part 31, the flexible mechanical part 31 suffers the external force FRC and a counterforce provided by the supporting part 33, such that the button area of the flexible mechanical part 31 is squeezed toward the substrate 32 and the button device 100, and the rim area is moved away from the substrate 32, thereby the flexible mechanical part 31 deforms from the downwardly-disposed dish to an upwardly-disposed dish. Meanwhile, the antenna ANT disposed in the rim area is moved away from the substrate 32, which changes the relative position between the antenna ANT and the substrate 32 (or other elements) in the wireless transceiver 10 to effectively change the radiation pattern of the antenna ANT. By carefully arranging the relative position between the antenna and the surrounded environment, the radiation pattern of the antenna may be changed by the press provided by the user, which reduces an influence due to the approaching of fingers of the human body to ensure the antenna performance is kept at a certain level such that the wireless signal is immediately transmitted.

In short, the wireless transceiver 10 of the present invention deforms the flexible mechanical part (or the housing) via the external force applied by the user to change the relative position between the antennas disposed on the flexible mechanical part in the wireless transceiver 10, which effectively changes the radiation pattern of the antenna. By carefully arranging the relative position between the antenna and the surrounded environment, the radiation pattern of the antenna may be changed as the press provided by the user, which reduces an influence due to the approaching of fingers of the human body to ensure the antenna performance is kept at a certain level such that the wireless signal is immediately transmitted. Those skilled in the art may make modifications accordingly, which is not limited.

Figure 4A:
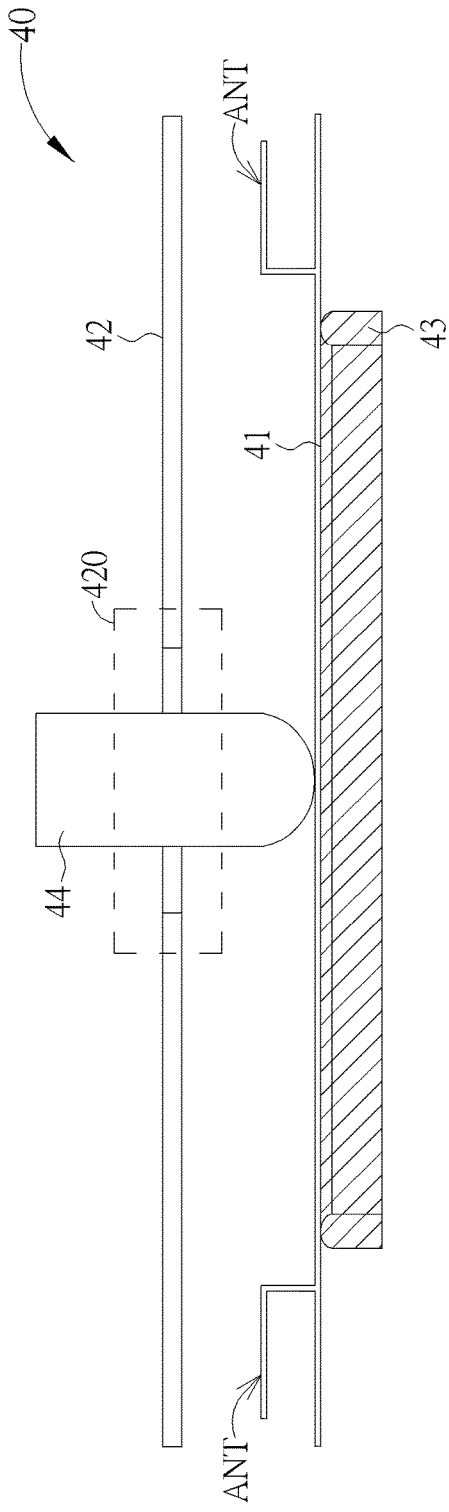
FIG. 4A illustrates a cross-section of a wireless transceiver according to another embodiment of the present invention.
Figure 4B:
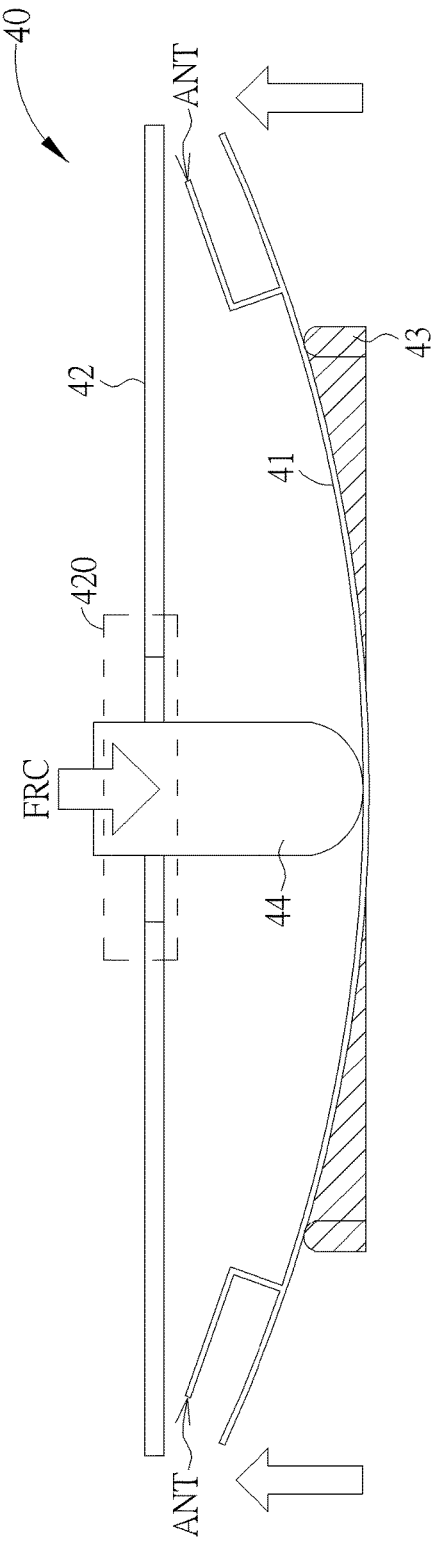
FIG. 4B illustrates a deformation of the wireless transceiver shown in FIG. 4A when an external force is applied.

For example, please refer to FIG. 4A to FIG. 4B. FIG. 4A illustrates a cross-section of a wireless transceiver 40 according to another embodiment of the present invention, and FIG. 4B illustrates a deformation of the wireless transceiver 40 when an external force is applied. Both the wireless transceivers 10 and 40 may change the relative position and the radiation pattern of the antenna via a deformation of the flexible mechanical part. A difference between the wireless transceivers 10 and 40 is that the external force FRC is directly applied to the flexible mechanical part of the wireless transceiver 10, while the external force FRC is indirectly applied to flexible mechanical part of the wireless transceiver 40 via another mechanical part, e.g. a push rod.

Specifically, as shown in FIG. 4A, a flexible mechanical part 41, a substrate 42, a supporting part 43, at least one antenna ANT and a push rod 44 are included and disposed in the wireless transceiver 40. Structurally, the antennas ANT are disposed on or attached to the flexible mechanical part 41. A flexible mechanical part 41 is disposed on the supporting part 43, and the supporting part is used for supporting the flexible mechanical part 41. A hole 420 is formed in a center of the substrate 42, and the push rod 44 is disposed in the hole 420 to be moved in the hole 420.

In operation, as shown in FIG. 4B, when the user presses on the wireless transceiver 40, the push rod 44 may move in the hole 420 along a direction of the external force FRC, such that the push rod 44 may apply the external force FRC to the flexible mechanical part 41. In other words, when the external force FRC is applied to the push rod 44, push rod 44 then applies the external force FRC to the flexible mechanical part 41, the flexible mechanical part 41 suffers the external force FRC and a counterforce provided by the supporting part 43, thereby the flexible mechanical part 41 may be deformed into an upwardly-disposed dish from a flat plane. Meanwhile, the antenna ANT disposed on the rim area of the flexible mechanical part 41 is moved to the substrate 42, which changes a relative position between the antenna ANT and the substrate 42 (or other elements) to effectively change the radiation pattern of the antenna. On the contrary, without the external force applying to the flexible mechanical part 41, or the external force FRC applied to the push rod 44 disappears, the flexible mechanical part 41 presents a flat plane and covers the supporting part 43.

Therefore, the wireless transceiver 40 may deform the flexible mechanical part via the external force provided by the press of the user, which changes a relative position of the antenna disposed on the flexible mechanical part of the wireless transceiver 40 to effectively change the radiation pattern of the antenna.

Please refer to FIG. 5A to FIG. 5B. FIG. 5A illustrates a cross-section of a wireless transceiver 50 according to another embodiment of the present invention, and FIG. 5B illustrates a deformation of the wireless transceiver 50 when an external force is applied. Please note that the wireless transceiver 50 is designed according to a linkage mechanism, wherein a linkage mechanical part is structurally deformed via an external force due to its structure, which is different from that of the flexible mechanical parts 31 and 41 of the wireless transceivers 10 and 40, which are elastically deformed via the external force due to its flexibility.

Specifically, as shown in FIG. 5A, the wireless transceiver 50 includes a mechanical part 51, a substrate 52, at least one antenna ANT and a push rod 54. In this embodiment, the mechanical part 51 is a linkage mechanical part, which may be structurally deformed via an external force. The linkage mechanical part 51 includes a plurality of first links 511, a plurality of second links 512, a first pivot 513 and a plurality of second pivot 514. Structurally, the antennas ANT are disposed or attached on the second link 512. A hole 520 is formed in a center of the substrate 52. The push rod 54 is coupled to the first pivot 513 and disposed in the hole 520 to move in the hole 520. The first pivot 513 is used for pivoting the push rod 54 and the first link 511, each one of the second pivots 514 is used for pivoting one of the plurality of first pivots 513 and one of the plurality of second pivots 514.

In operation, as shown in FIG. 5B, when the user is pressing on the wireless transceiver 50, which means that the external force FRC is applying to the push rod 54 to move in the hole 520 along a direction of the external force FRC, such that the push rod 54 may apply the external force FRC to the first link 511 of the linkage mechanical part 51. The first link 511 suffers an interaction between the external force FRC and the first pivot 513 and second pivot 514, causing the first pivot 513 and second pivot 514 to rotate and move, and the direction of the external force FRC is changed from vertical to be horizontal. As a result, the second link 512 may be pushed by the first link 511 and move along the horizontal direction to be away from the substrate 52, thereby a relative position between the antenna ANT and the substrate 52 or other elements is changed, which changes the antenna radiation pattern of the antenna ANT. On the contrary, without the external force applied to the linkage mechanical part 51, or when the external force FRC applied to the push rod 54 disappears, the linkage mechanical part 51 returns to its original appearance as shown in FIG. 5A.

Therefore, the wireless transceiver 50 may deform the linkage mechanical part via the external force provided by the press of the user, such that a relative position of the antenna disposed on the linkage mechanical part in the wireless transceiver 50 is changed, which effectively changes the radiation pattern of the antenna.

To sum up, the wireless transceiver of the present invention deforms the mechanical part (which may be flexible or linkage mechanical part) via the external force applied by the user to change the relative position between the antenna disposed on the mechanical part in the wireless transceiver, which effectively changes the radiation pattern of the antenna. By carefully arranging the relative position between the antenna and the surrounded environment, the radiation pattern of the antenna may be changed as the press provided by the user, which reduces an influence due to the approaching of fingers of the human body to ensure the antenna performance is kept at a certain level such that the wireless signal is immediately transmitted.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless transceiver, comprising:
   at least one antenna;
   a substrate; and
   a mechanical part on which the at least one antenna is disposed, wherein a relative position between the at least one antenna and the substrate is changed when an external force is applied to the mechanical part;
   a housing for covering the wireless transceiver;
   wherein the housing is made of flexible materials to be flexible, and when the external force is applied to the housing, the housing is deformed to apply the external force to the mechanical part via the housing.

2. The wireless transceiver of claim 1, wherein the mechanical part is a flexible mechanical part.

3. The wireless transceiver of claim 2, further comprising a supporting part for supporting the flexible mechanical part.

4. The wireless transceiver of claim 3, wherein the supporting part is disposed on the substrate.

5. The wireless transceiver of claim 4, wherein the flexible mechanical part presents a downwardly-disposed dish to cover the supporting part when the external force applied to the flexible mechanical part disappears; and the flexible mechanical part suffers the external force and a counterforce provided by the supporting part when the external force is applied to the flexible mechanical part, such that the flexible mechanical part presents an upwardly-disposed dish.

6. The wireless transceiver of claim 3, wherein a hole is formed in the substrate, and the wireless transceiver further comprises a push rod disposed in the hole, wherein when the external force is applied to the push rod, the push rod moves in the hole along a direction of the external force, such that the push rod applies the external force to the flexible mechanical part.

7. The wireless transceiver of claim 6, wherein when the external force applied to the push rod disappears, the flexible mechanical part presents a flat plane and covers the supporting part; when the external force is applied to the push rod, and the push rod then applies the external force to the flexible mechanical part, the flexible mechanical part suffers the external force and a counterforce provided by the supporting part, such that the flexible mechanical part deforms from the flat plane to an upwardly-disposed dish.

8. The wireless transceiver of claim 1, wherein the mechanical part is linkage mechanical part, and the linkage mechanical part comprises:
   a plurality of first links;
   a plurality of second links, wherein each of the at least one antenna is respectively disposed on the plurality of second links;
   a first pivot for pivoting the plurality of first links; and
   a plurality of second pivots, each one of the plurality of second pivots is used for pivoting one of the plurality of first links with one of the plurality of second links.

9. The wireless transceiver of claim 8, wherein a hole is formed in the substrate, and the wireless transceiver further comprises a push rod disposed in the hole and coupled to the first pivot, wherein when the external force is applied to the push rod, the push rod moves in the hole along a direction of the external force, such that the push rod applies the external force to the plurality of first links of the linkage mechanical part.

10. The wireless transceiver of claim 9, wherein when the push rod applies the external force to the linkage mechanical part, the flexible mechanical part suffers an interaction between the external force and the first and second pivots, causing the first and second pivots to rotate and move, and the direction of the external force is changed from a first direction to a second direction, and the second link is pushed by the first link and moved along the second direction.

11. The wireless transceiver of claim 1, further comprising a button device disposed on the substrate for generating a trigger signal to a wireless processing module when the external force is applied to the mechanical part to touch the button device, which triggers the wireless processing module to generate the wireless signal to the at least one antenna according to the trigger signal.

12. The wireless transceiver of claim 1, wherein the mechanical part is a part of the housing.

* * * * *